Sept. 24, 1957 C. E. GERMANTON 2,807,796

REGISTER CIRCUIT

Filed March 18, 1955 5 Sheets-Sheet 1

INVENTOR
C. E. GERMANTON
BY A. J. Kane
ATTORNEY

INVENTOR
C. E. GERMANTON
BY
A. F. Kane
ATTORNEY

Sept. 24, 1957 C. E. GERMANTON 2,807,796

REGISTER CIRCUIT

Filed March 18, 1955 5 Sheets-Sheet 3

INVENTOR
C. E. GERMANTON
BY A. F. Kane
ATTORNEY

INVENTOR
C. E. GERMANTON
BY
A. F. Kane
ATTORNEY

Sept. 24, 1957 C. E. GERMANTON 2,807,796

REGISTER CIRCUIT

Filed March 18, 1955 5 Sheets-Sheet 5

INVENTOR
C. E. GERMANTON
BY A. J. Kane
ATTORNEY 2,807,796

REGISTER CIRCUIT

Charles E. Germanton, Summit, N. J., assignor to Bell Telephone Laboratories, Incorporated, New York, N. Y., a corporation of New York Application March 18, 1955, Serial No. 495,088

8 Claims. (Cl. 340—166)

This invention relates in general to "memory" systems and particularly to relay register circuits of the type used extensively in telephone switching systems.

Relay type register circuits and particularly so called originating registers are used in telephone switching systems primarily for receiving, counting, and registering the called number digits, or station designations dialed by a calling subscriber. Such register circuits generally involve a plurality of digital registers each including five relays which are caused to operate, in well known manner, according to the conventional two-out-of-five code, it being understood that each of the digits 1 to 9, and 0, may be distinctively represented by the operation of a different combination of two relays out of a total of five. Each register is allocated to one of the digital positions of which a station designation may be constituted. When a combination of two relays in each digital position register responds to the actuation of the subscriber's dial, the relays lock operated and are held in this condition until the apparatus into which the registers work is ready to receive the stored pulses. In systems of the prior art, this hold condition which maintains during the "remembering" process of the register, imposes a relatively great load on the central office batteries because of the heavy current drain resulting from the flow of holding current required to maintain the register relays operated.

It is one object of this invention to provide a simplified and otherwise improved memory circuit and particularly to provide an improved telephone relay register circuit which eliminates current drain in the remembering process thereof.

This object is attained in accordance with a feature of the invention by employing, in a multirelay register circuit, a plurality of single coil, polarized relays, the movable elements or armatures of which are maintained in their operated positions magnetically, thus precluding the necessity for current consuming holding circuits.

In accordance with another feature of the invention, the operating coils of the polarized relays of this register circuit are so interwired with respect to each other and to the pulse transmitting circuit with which the register functions, that "write" and "erase" functions of the register are performed simultaneously, that is, each write-in operation erases a previously registered write-in operation.

These and other features of the invention will be readily understood from the following detailed description when read with reference to the accompanying drawings in which:

Fig. 6 shows the manner in which Figs. 2, 3, 4 and 5 are to be arranged to effect a complete circuit diagram of the terminating register of a telephone system embodying the features of the invention.

As an exemplary disclosure of the memory circuit of this invention, the subsequent detailed description and related drawings describe and illustrate the invention as used in a telephone system such as disclosed in Patent 2,585,904 to A. J. Busch of February 19, 1952, and in Patent 2,616,974 to J. W. Dehn of November 4, 1952. The systems of these patents are crossbar automatic systems utilizing originating register circuits, which are common to calling lines and which are used for transmitting the usual dial tone to a calling subscriber and for receiving, counting, and registering the called number digits dialed by such subscriber.

Figure 1:
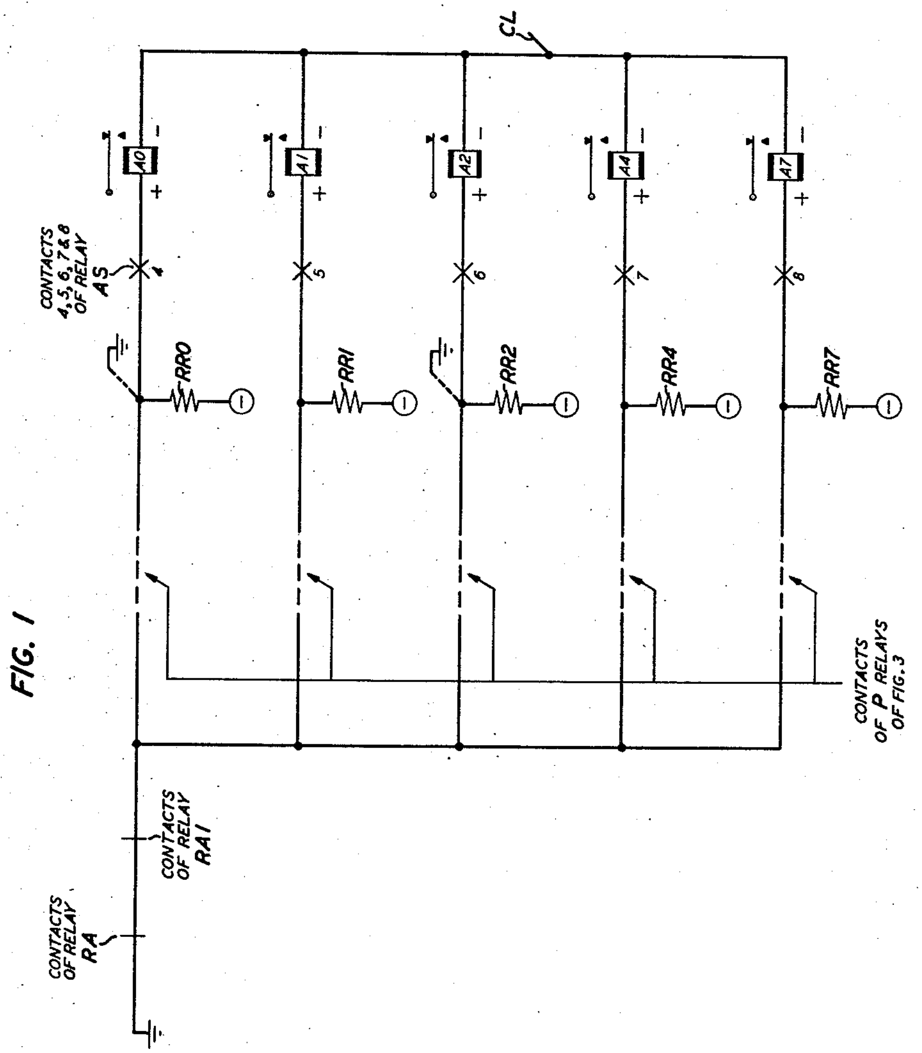
Fig. 1 is a simplified circuit diagram of a relay-type register circuit involving the features of the invention.
Figure 6:
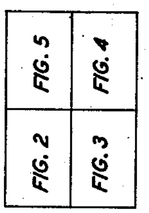
Figure 4:
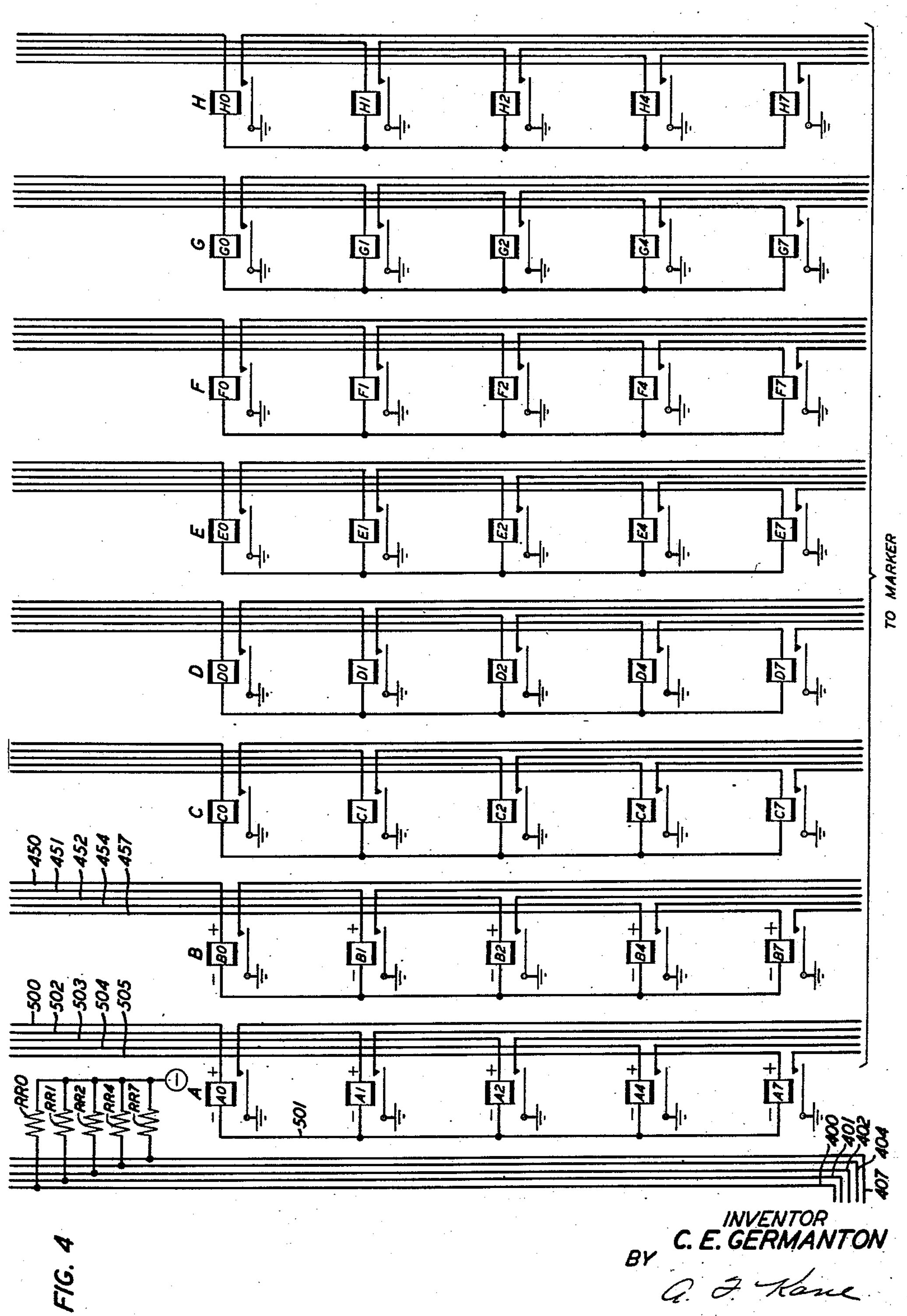
Fig. 4 shows a group of register relays for registering, on a two-out-of-five basis, as many as eight digits.

Referring to the circuit diagram of Fig. 1, a brief description of the memory circuit, per se, of this invention will be made. The relays A0, A1, A2, A4 and A7 constitute the five relays of a register A which is shown in Fig. 4. Each of these relays is polarized and is adapted to be operated to a circuit closing position when its winding is traversed by current flowing in the direction from left to right viewing Fig. 1, that is, from the plus terminal to the minus terminal, and to a circuit opening position when its winding is traversed by current flowing in the reverse direction. The circuit closing operation results in the performance of a "write" function whereas the circuit opening operation results in the performance of an "erase" function. The circuit controlling armature of each relay remains in whatever position it is moved to incident to the energization of the relay winding, and is held in such position magnetically, thereby eliminating the need for a holding circuit and the consequent current drain.

Figure 5:
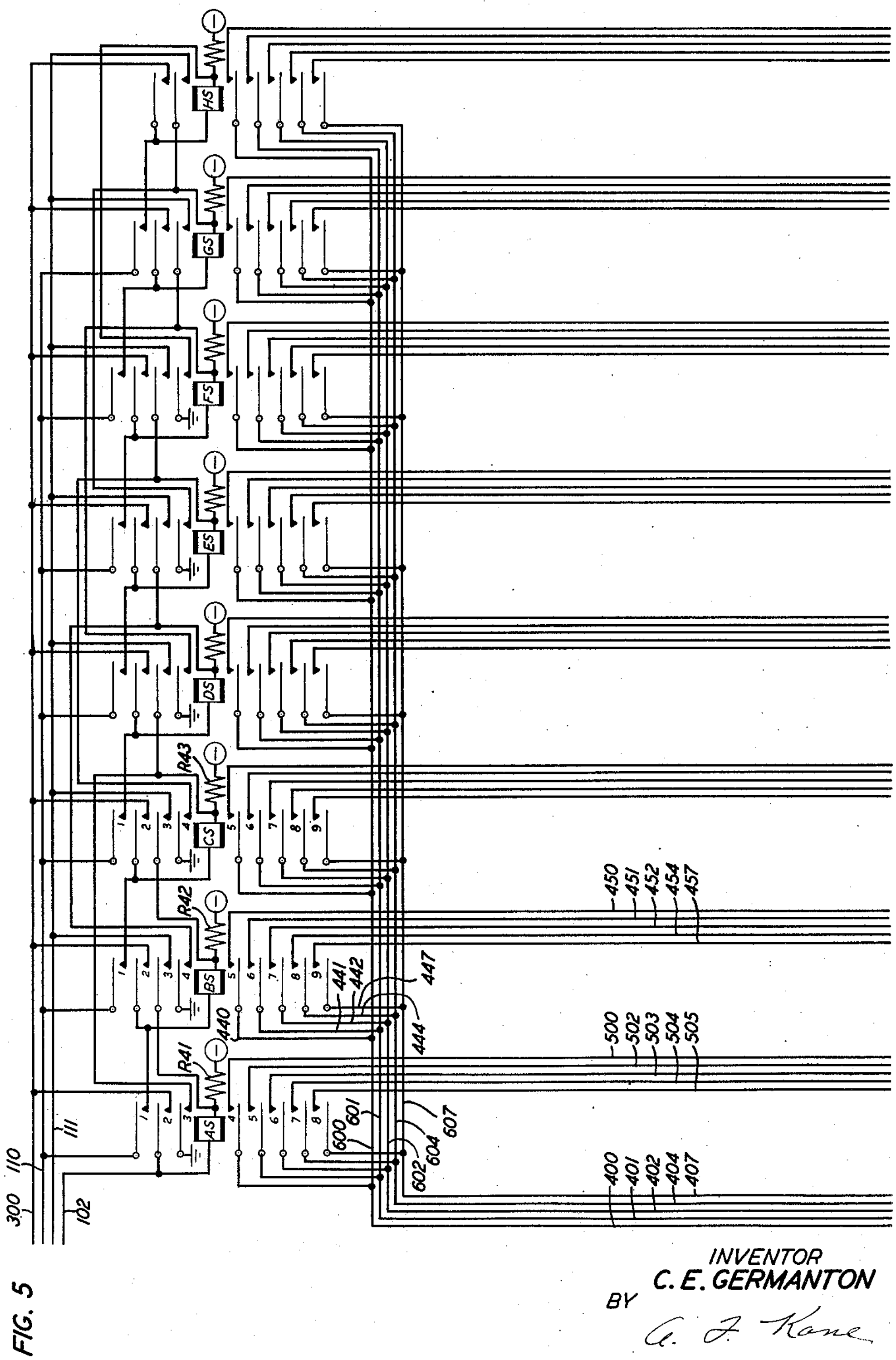
Fig. 5 shows a group of steering relays for insuring that successive digits are registered in successive relay registers, such as the A register, the B register, etc. of Fig. 5.

The plus terminal of each relay, incident to the operation of a steering relay such as relay AS, in Fig. 5, is connected to negative 48-volt battery potential by way of an individual resistance such as RR0, RR1, etc., and the minus terminals of all relays are connected to a common lead CL. Relays RA and RA1 of Fig. 2 function to momentarily apply ground, by way of contacts of counting relays such as relay P2 of Fig. 3, to the plus side of a certain two of the relay windings A0 to A7 whereby, when the steering relay AS is operated, such two of the relays A0 to A7 operate, assuming operation on a two-out-of-five code basis.

For exemplary purposes it will be assumed that ground potential is applied to the plus terminals of register relays A0 and A2 as indicated. Resistances RR0 and RR2 are accordingly shunted out whereby the following circuits result:

From ground, through the winding of relay A0 in the "write," or plus to minus direction, conductor CL, through the windings of relays A1, A4 and A7 in the "erase," or minus to plus direction, over resistances RR1, RR4 and RR7, to battery. Ground is also extended through the winding of relay A2 in the "write," or plus to minus direction, over conductor CL and then in parallel through the windings of relays A1, A4 and A7 in the "erase," or minus to plus direction, to battery through resistances RR1, RR4 and RR7. Relays A0 and A2 thus are caused to operate in the "write" direction and relays A1, A4 and A7 in the "erase" direction. Relays A0 and A2 thereby combine to store the digit 2, the dialing of which by the subscriber caused the application of ground as described. Similarly, all relays A1, A4 and A7 which, if previously operated to a "write" position, are now operated to the "erase" position. It will be noted that the polarized relays A0 to A7 remain in whatever position they are operated to incident to the energization of their windings either by "write" or "erase" current and their circuit controlling armatures are held in their operated positions magnetically, it being apparent that no holding circuits are required for this purpose. Obviously, also, the need for holding current and the consequent drain on central office batteries are eliminated.

The structural aspects of a register unit which is particularly suitable for use in the telepsone system hereinafter to be described is disclosed in a patent application of C. E. Germanton and J. W. Oliver filed concurrently with this application and bearing Serial No. 495,114.

The following description covers the application of the invention to a pulse registering circuit as used in telephone switching systems.

When a calling subscriber initiates a call, common control equipment, termed a marker, is brought into service to interconnect such subscriber with an originating register circuit. This register circuit is arranged to provide the usual dial tone signal to the subscriber as a directive to commence dialing the called number. As the subscriber dials the digits of the number to be called, the register is arranged to count the pulses in each separate digit, to register each digit separately, and, at the proper time, to seize an idle marker circuit to which the dialed digits are transferred along with other information required by such marker in performing the switching functions necessary to effect the desired connection. When the marker has received all of the information registered in the originating register, it releases the register and proceeds with subsequent functions which are of no particular importance in so far as a complete understanding of the present invention is concerned.

The following detailed description, including the above-identified drawings forming a part thereof, is confined to the digit counting, digit steering, and digit registering operations performed at the originating register prior to the seizure of an idle marker for the purpose of completing the desired connection. All circuit operations prior to the seizure of an idle originating register and just prior to the seizure of an idle marker by the register have been omitted as unnecessary, the above Busch and Dehn disclosures providing complete details not shown or described herein.

Upon the seizure of an idle originating register by a marker circuit, the off-normal relay ON in the originating register is operated. Relay ON, operated, completes an operating circuit for relay ST, in the pulse counting circuit of Fig. 3, extending from ground, over contact 2 on relay ON, contact 5 of slow releasing relay SR, conductor 101, through the winding of relay ST, to battery by way of resistance R11. Relay ST operates and locks over its contact 2, conductor 200, to ground over contact 2 of relay ON. Relay ST is the start relay of the pulse counting chain shown in Fig. 3 which comprises relays P1 to P10 in addition to relay ST. Relay ST is operated and locked, as described, to prepare the counting chain for the reception of the pulse of the first digit to be dialed by the calling subscriber.

Relay ON operates relay 11A in a circuit extending from ground, over contact 2 of relay ON, contact 2 of relay SR, winding of relay 11A to battery through resistance R12. Relay 11A, operated, locks over its contact 2 to ground on contact 2 of relay ON. Relay 11A is operated in order to condition the group of relays 11A, 11B and 11X, preparatory to the recognition of a single initial pulse, which will be absorbed, or of two initial digits of the value of one pulse each, which will indicate that the number being dialed involves an 11X toll directing prefix or special code, where X may be any digit from 2 to 9.

Relay ON, upon operating, operates the steering relay AS, (Fig. 5) associated with the register relays A0 to A7, (Fig. 4) in a circuit extending from ground, over contact 1 to relay ON, contact 1 of relay SR, conductor 102, winding of relay AS, to battery through resistance R41. Relay AS operates and locks over its contact 2, conductor 300, to ground over contact 1 of relay ON. Relay AS, operated, prepares the register relay network of Fig. 4 for registration of the first digit in the A digit register relays A0 to A7, unless it is a digit 1 as above indicated.

Subsequent to the seizure, by a marker, of the originating register and the operation of off-normal relay ON with the results described, the marker will effect the necessary switching operations to interconnect the calling subscriber's line and the seized originating register, whereupon the marker will be released. The details of such switching functions may be obtained in the above-identified Busch disclosure. Upon the completion of such connection a circuit is completed for operating relay L from battery, through the upper winding of relay L, through the lower left winding of the dial tone transformer 105, over the ring conductor 104 of the trunk line frame switch terminating the originating register, through the switch train to the ring conductor of the calling line, over the closed line loop, back over the tip conductor of the calling line, through the switch train, over the tip conductor 103 of the trunk line frame switch, through the upper left winding of dial tone transformer 105, to ground. Relay L operates in this circuit.

Relay L, operated, moves its armature from its normal released position to a position in which it engages contacts 1 and 2 thereof. Relay SR is thereupon operated in a circuit extending from ground, over contact 3 of relay ON, armature and contact 1 of relay L, through the low resistance winding of relay L, to battery through the winding of relay SR.

At this point relays ON, L, SR, ST, 11A and AS are operated, the latter three relays remaining operated under the control of off-normal relay ON when relay SR operates, as described.

Dial tone is supplied to the calling subscriber from the source 112, through the right primary winding of transformer 105, by induction to the upper and lower secondary windings of transformer 105 and over the subscriber's line by way of the switch train. The subscriber, upon hearing the dial tone signal, proceeds to dial the digits of the desired line designation.

It is well known that when a subscriber dials, the mechanism on his substation produces a momentary open condition in the line loop followed by a closure thereof for each pulse of each digit and that the line closures between pulses of a digit are much shorter in duration than the closures thereof between digits.

If, by accident, or otherwise, the initial digit of one pulse is transmitted, the originating register is arranged to absorb this pulse on the assumption that it is transmitted or created in error. The circuit is arranged, however, as previously indicated, to recognize the first digit of one pulse followed by a second digit of one pulse as a legitimate indication that a special 11X code is to be transmitted and prepares itself to register successive digits.

It is deemed unnecessary to describe in this application the manner in which the first single digit is absorbed. An arrangement for accomplishing this function is described in detail in Patent 2,623,114 to F. K. Low of December 23, 1952. It is also described in the Low patent how an 11X code call is handled.

When relay L reoperated at the end of the first pulse of the first digit, as fully described in the Low patent, relays RA, L, SR, P1 and 11A were operated.

It will be assumed that the first digit, exclusive of a 1 or an 11 prefix, is one containing two pulses and that, therefore, the second pulse will be received by relay L before relay RA can release.

When relay L releases in response to the second open loop period of the second pulse, relay RA is reenergized to insure its remaining operated. Relay L, upon releasing, operates counting relay P2 in a circuit extending from ground over contact 3 of relay ON, armature of relay L, contact 4 of relay L, contact 4 of relay SR, pulsing conductor 106, contact 1 of relay P1, winding of relay P2, to battery through resistance R2. Relay P2 operates and locks over its contact 2, conductor 201, contact 4 of relay RA1, to ground over contact 2 of relay ON.

When relay P2 operates, the following functions are performed:

(1) The operating ground for relay P2 on conductor 106 is extended over contact 1 of relay P2 to the left side of the winding of relay P3, relay P3 not being able to operate because the right side of its winding is shunted to ground over contact 4 of relay P1;

(2) Contact 3 of relay P2 is closed to partly establish a shunting ground circuit (which will be completed over conductor 107 when relay L reoperates at the end of the pulse) for shunt-releasing relay P1 when relay L reoperates;

(3) Contact 4 of relay P2 is closed to extend ground to the right side of the winding of relay P4, thereby to prevent the operation of relay P4 when and if relay P3 operates during a third pulse; and (4) Contact 4 of relay P2 grounds a circuit for operating relay P2A (Fig. 2) extending from ground, over contact 4 of relay P2, conductor 202, contact 6 of relay P2A, to battery through the winding of relay P2A. Relay P2A, operated, locks over its contact 7 to off-normal ground on contact 2 of relay ON.

When relay L reoperates at the end of the second pulse, relay P1 is shunt released by ground, over contact 2 of relay L, conductor 107, contact 3 of relay P2, to the right side of relay P1.

At the end of the digit, relay RA releases, as above described, to operate relay RA1 momentarily as described previously. During the interval of time inherently necessary for any relay to operate, there will be a short period of time when the back contacts 3 of relay RA are closed and the back contacts 3 and 4 of relay RA1 are also closed, due to the inherent operating time of relay RA1. During this interval, the digit 2, which has been counted by the counting chain of Fig. 2, must be steered to and registered in the A digit register relays A0 to A7 (Fig. 4). As will be appreciated, the digit value, as counted, is represented by one operated relay, such as relay P2, out of ten such relays, whereas the digit registers of Fig. 4 are arranged to register digits on a two-out-of-five code basis, which code is illustrated by the table below, taking the A digit register as an example:

| Digit: | Relays operated |
|---|---|
| 1 | A0—A1 |
| 2 | A0—A2 |
| 3 | A1—A2 |
| 4 | A0—A4 |
| 5 | A1—A4 |
| 6 | A2—A4 |
| 7 | A0—A7 |
| 8 | A1—A7 |
| 9 | A2—A7 |
| 0 | A4—A7 |

From an inspection of Fig. 5, it will be noted that relays A0 to H0 can be operated over conductor 400, relays A1 to H1 over conductor 401, relays A2 to H2 over conductor 402, relays A4 to H4 over conductor 404 and relays A7 to H7 over conductor 407. These five conductors are connected to contacts of the counting relays in such a manner that upon operation of one of such relays, relay P2, for example, only two conductors of the five will be arranged to have ground applied thereto as will be described presently. Needless to say, the two conductors energized will conform to the above indicated code according to the digit represented by the counting relay operated. Ground is supplied over contact 5 of relay P2A, contacts 3 of relay RA1, contacts 3 of relay RA, conductor 108, contacts 5 and 6 of relay P2, to conductors 400 and 402. Ground on these conductors is extended to the right side of relay A0 by way of contact 4 of relay AS and to the right side of relay A2 by way of contact 6 of relay AS. It will be observed that all conductors 400, 401, 402, 404 and 407 are permanently connected to 48-volt battery potential by way of resistances RR0, RR1, RR2, RR4 and RR7, respectively. Since ground has been applied to conductors 400 and 402, the corresponding resistances RR0 and RR2 are shunted out and relays A0 and A2 will be operated in the following manner:

Ground on conductor 400 is now extended over contact 4 of relay AS, conductor 500, winding of relay A0 in the "write" direction from plus to minus, conductor 501, winding of relays A1, A4 and A7 in the "erase" direction from minus to plus, conductors 502, 504 and 505, contacts 5, 7 and 8 of relay AS, conductors 401, 404 and 407, resistances RR1, RR4 and RR7, to 48-volt battery. Similarly, ground on conductor 402 is extended over the contact 6 of relay AS, conductor 503, winding of relay A2 in the "write" direction from plus to minus, conductor 501 and thence in parallel through the windings of relays A4 and A7 in the "erase" direction from minus to plus, conductors 504 and 505, contacts 7 and 8 of relay AS, conductors 404 and 407, resistances RR4 and RR7 to 48-volt battery. Register relays A0 and A2 are thus operated in the "write" direction to store the first digit 2, and relays A1, A4, and A7 are energized in the "erase" direction and will, therefore, restore their armatures if they, or any of them had been operated.

Relays A0 and A2 therefore are operated to register the first digit, the current through these relays at this time being referred to as "write" current and the current in the remaining relays A1, A4 and A7 being referred to as "erase" current. It will be observed, at this time, that the armatures of the polarized relays A0 and A2 remain in their operated positions and do not require holding circuits or holding current for this purpose. The relay armatures are held magnetically.

When relay RA1 operates momentarily, as described, the application of ground to the register relays is interrupted and though the energizing current to the register relays is thus discontinued, the relays remain in their operated positions, that is, relays A0 and A2 remain in their "write" positions and the remaining relays remain in their "erase" positions.

Relay RA1, upon operating, as previously described, releases relay P2 and reoperates and locks relay ST preparatory to counting the next digit.

Relay RA1, upon operating, advances the steering circuit of Fig. 5 to permit the operation of the B register relays according to the second digit of the designation of the called station. Relay BS is operated in a circuit extending from ground over contact 1 of relay RA1, contact 2 of relay P2A, conductor 110, contact 1 of relay AS, winding of relay BS, to battery through resistance R42. Relay BS locks over its contact 2 of off-normal ground on conductor 300. Relay BS accomplishes the following functions:

(1) Prepares, at its contact 1, a circuit for operating relay CS at the end of the second digit registration, relay CS not being able to operate at this time because of the ground shunt on the right side of its winding from contact 3 of relay AS;

(2) Prepares, at its contact 3, a circuit for shunt-releasing relay AS upon the release of relay RA1;

(3) Grounds, at its contact 4, the right side of the winding of relay DS to prevent the operation of this relay when and if relay CS operates later; and (4) Prepares, at its contacts 5, 6, 7, 8 and 9 a circuit for operating the B register relays B0 to B7 according to the pulse count registered in the counting relays of Fig. 3 at the end of the second digit.

Upon the eventual release of relay RA1, at the end of the transient period above described, relay AS is shunt-released by ground, over contact 2 of relay RA1, contact 4 of relay P2A, conductor 111, over contact 3 of relay BS to the right side of the winding of relay AS. Relay AS, upon releasing, removes at its contact 3, the previous ground shunt on the right side of the winding of relay CS, thereby enabling relay CS to operate over contact 1 of relay BS at the end of the second digit. Relay AS, upon releasing, opens, at its contacts 4, 5, 6, 7, 8 and 9 the circuits to the A register relays to prevent any undesired effects upon relays A0 to A7 upon subsequent grounding of conductor 106 for registering purposes.

Figure 3:
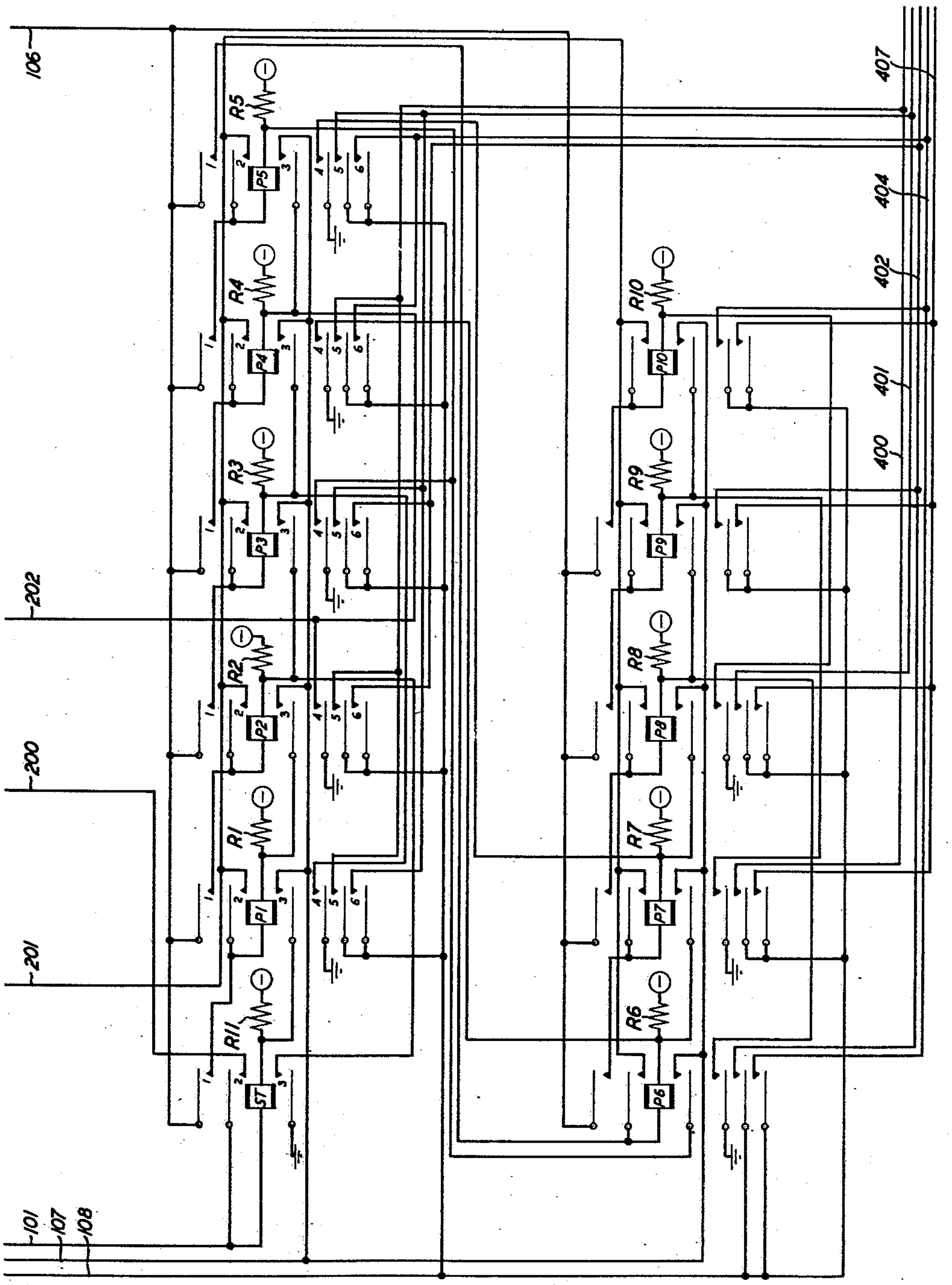
Fig. 3 shows a chain of relays arranged for counting impulses in each digit.

The A digit, assumed to be 2, has now been registered in relays A0 and A2, the digit-steering circuit of Fig. 4 has been advanced preparatory to registering the second digit, the pulse counting circuit of Fig. 3 has been restored to normal, and the interdigital timing relay RA and auxiliary relay RA1 have been released so that the entire circuit is prepared to receive, count, steer, and register the second digit.

Let it be assumed that the second digit is composed of three pulses. In the manner described above regarding the first digit of two impulses, relay L will release and reoperate in response to each pulse.

Upon the release of relay L, responsive to the open loop period of the first pulse, relay RA reoperated as above described, thereby opening the operating circuit for the register relays of Fig. 4 and discharging condenser C3. The first release of relay L operates and locks operated relay P1 as above described. Upon the reoperation of relay L, at the end of the first pulse, relay ST is shunt-released.

Upon the release of relay L, responsive to the open loop period of the second pulse, relay P2 is operated and locked, the operated relay P1 preventing relay P3 from also operating as above described. At the end of the second pulse, when relay L reoperates, relay P1 is shunt-released thereby conditioning relay P3 for operation during the third pulse, if any.

When relay L releases during the third pulse, relay P3 is operated in a circuit extending from ground, over contact 3 of relay ON, armature of relay L, contact 4 of relay L, contact 4 of relay SR, conductor 106, contact 1 of relay PT, winding of relay P3, to battery through resistance R3. Relay P3 operates and locks over its contact 2 to off-normal ground on conductor 201. Relay P4 cannot operate at this time due to the ground shunt on the right side of its winding from contact 4 of relay P2. Relay P3, upon operating, applies ground over its contact 4 to the right side of the winding of relay P5 to prevent the operation of the latter should relay P4 be operated in response to a fourth pulse. Relay P3, upon operating, also prepares at its contact 3 a shunt circuit for shunt-releasing relay P2 upon the reoperation of relay L at the end of the third pulse.

When relay L reoperates at the end of the third pulse, relay P2 is shunt-released. When relay L remains operated for a length of time which indicates an interdigital pause, relay RA releases as above described.

Figure 2:
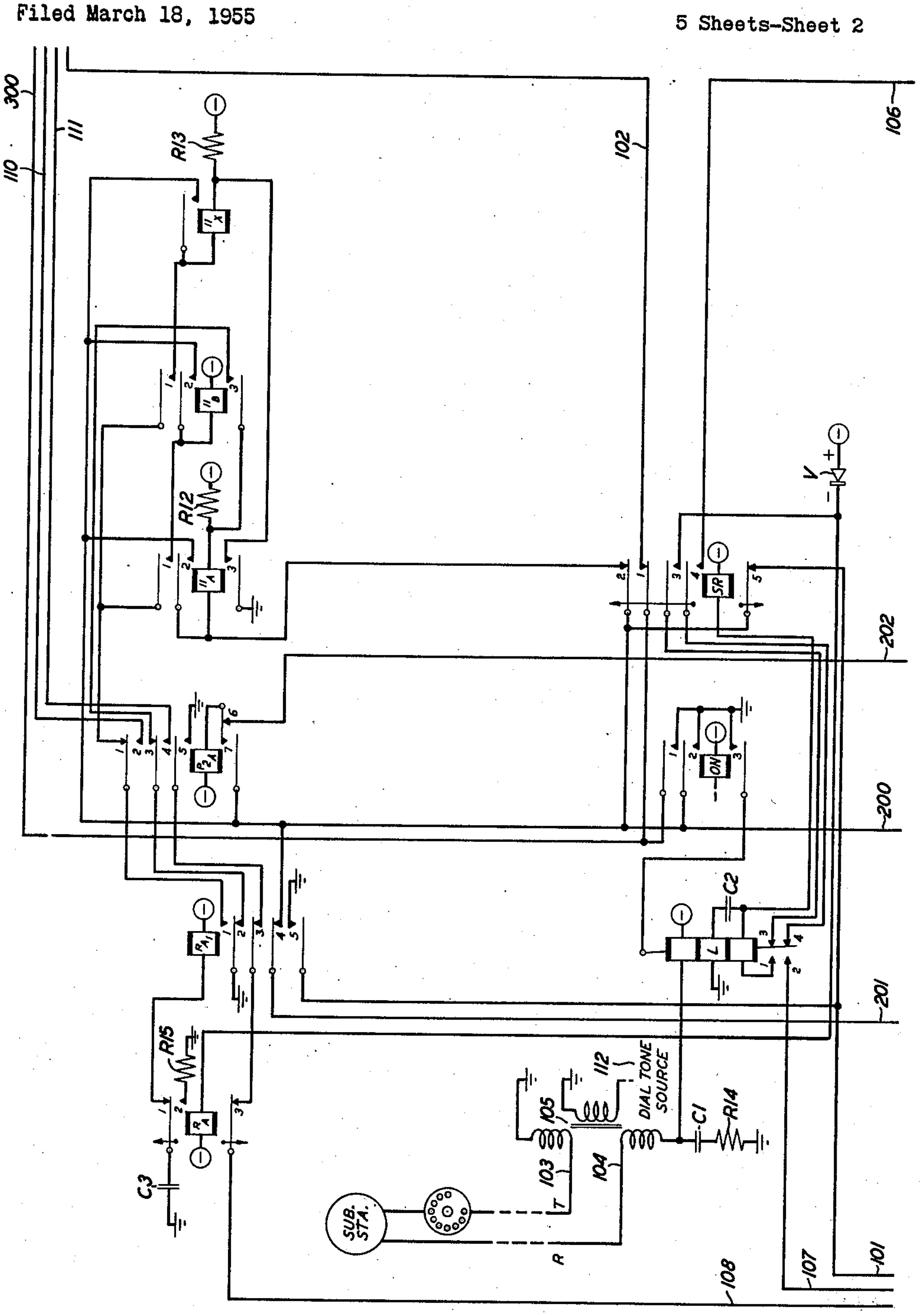
Fig. 2 shows part of an originating register termination of a calling telephone subscriber's line, the relay L of the register which follows the dial pulses, the off-normal relay ON, etc.

Upon the release of relay RA, and prior to the momentary operation of relay RA1, ground is applied over contact 5 of relay P2A, Fig. 2, contact 3 of relay RA1, contact 3 of relay RA, conductor 108, contacts 5 and 6 of relay P3, Fig. 3, to conductors 401 and 402, conductors 601 and 602, Fig. 5, conductors 441 and 442, Fig. 4, contacts 6 and 7 of relay BS, conductors 451 and 452, to the right terminals of the windings of relays B1 and B2. This application of ground potential to conductors 401 and 402 shunts the corresponding resistances RR1 and RR2, Fig. 5, so that energizing paths for the five relays B0 to B7 of register B are effected, the paths through the windings of relays B1 and B2 being in a direction from plus to minus, that is, in the "write" direction and the paths through the windings of relays B0, B4 and B7 being in the reverse or "erase" direction. One such path may be traced from ground on conductor 401 over conductor 601, conductor 441, contact 6 of relay BS, conductor 451, winding of B register relay B1 in the "write" direction, winding of B register relay B0 in the "erase" direction, conductor 450, contact 5 of relay BS, conductor 440, conductors 600 and 400, resistance RR0 to 48-volt battery potential. Similarly, another circuit may be traced from ground on conductor 402, over conductor 602, conductor 442, contact 7 of relay BS, conductor 452, winding of B register relay B2 in the "write" direction, thence in parallel over the windings of B register relays B4 and B7 in the "erase" direction, conductors 454 and 457, contacts 8 and 9 of relay BS, conductors 444 and 447, conductors 604 and 607, resistances RR4 and RR7 to 48-volt battery potential.

The B register relays B1 and B2, accordingly, are operated to store the second digit, assumed to be 3, and relays B0, B4 and B7, or any thereof which may have been previously operated in the "write" direction, are now operated in the "erase" direction. Relays B1 and B2 are held in their operated positions magnetically and do not require any holding current for this purpose. Relays B0, B4 and B7 are similarly held in their "erase" positions.

As soon as relay RA1 operates momentarily, relay P3, Fig. 3, is released and relay ST is reoperated and locked as before, to return the counting chain of Fig. 3 to normal preparatory to registering the third digit.

Relay RA1, upon operating, advances the steering relays of Fig. 5. Relay CS operates in a circuit extending from ground over contact 1 of relay RA1, contact 2 of relay P2A, conductor 110, contact 1 of relay BS, winding of relay CS, to battery through resistance R42. Relay CS locks over its contact 2 to off-normal ground on conductor 300. Relay DS cannot operate at this time because the right side of its winding is shunted to ground over contact 4 of relay BS.

Relay CS, upon operating performs the following functions:

(1) At its contact 1, prepares the operating circuit for relay DS to be completed at the end of the third digit;

(2) At its contact 3 prepares the releasing shunt for relay BS, to be completed when relay RA1 releases;

(3) At its contact 4 applies ground to the right side of the winding of relay ES to prevent the operation thereof when relay DS operates at the end of the third digit; and (4) At its contacts 5, 6, 7, 8 and 9 prepares the circuit whereby the C digit will be registered in the relay group C0 to C7.

Upon the release of relay RA1, at the end of the transient period of operation, relay BS is shunt-released in a manner similar to that previously described in connection with the release of relay AS.

All of the circuits are now in condition for receiving, counting, steering and registering the next digit. It is deemed unnecessary to repeat the above description for the succeeding digits since the operation of the circuits is the same. Any number of digits may be counted, steered and registered in this manner, provision for eight such digits having been shown. It is to be noted that after the operation of two relays in each of the registers A to H to register a telephone designation, all relays operated to write-up such designation are held operated without the use of holding circuits thereby eliminating current drain in the remembering process of the memory circuit.

When sufficient digits have been registered to warrant the seizure of a marker for completing the desired connection, a marker seizure circuit (not shown) is completed in a manner similar to that described by Dehn or Busch, previously identified. As will be appreciated, one of the steering relays AS to HS, Fig. 5, operates as an indication that the preceding digit has been registered. For instance, relay BS operates after the first digit has been registered, relay CS operates after the second digit has been registered, etc., and relay HS operates to indicate that the seventh digit has been registered. As described by Dehn and Busch, the marker seizure may be effected under the control of such steering relays, for instance, upon the operation of relay HS as an indication that a full seven-digit number has been registered.

When the marker is seized, the information registered in Fig. 4, along with information of no particular importance to the present invention, is transferred to register relays in the marker circuit indicated at the bottom of Fig. 4.

When the seized marker is satisfied, by suitable well-known check circuits, that it has received all of the necessary information from the originating register circuit, the off-normal relay ON in the latter circuit is released, thereby restoring the entire originating register circuit to normal.

While the memory circuit of this invention has been described in its application to a digit register it is to be understood that it, obviously, has many other applications particularly in the art of telephone switching.

What is claimed is:

1. In a register circuit, a plurality of polarized relays, a source of potential, means including a resistance interposed between one terminal of each of said relays and said source of potential, means electrically interconnecting the other terminals of all said relays whereby a plurality of parallel branch circuits is effected, each including a polarized relay, a resistance and said source of potential, and means for connecting one of the parallel branch circuits in series relation to the remaining parallel branch circuits so that the relay of the said one branch circuit is poled oppositely to the remaining relays with respect to said source of potential, said means including switching means for shunting the resistance included in the said one of the parallel branch circuits.

2. In combination, a signal storing network comprising a plurality of parallel branch circuits each including a source of potential, a winding of a polarized electromagnet and a resistance interposed between said source of potential and one terminal of said winding, a common termination for the other terminals of the electromagnet windings of all said branch circuits whereby the shunting of any combination of resistances in said branches results in the flow of current in one direction in the branches including the shunted resistances and in the reverse direction in all other branches, and means for shunting a combination of said resistances.

3. A signal storing network comprising a plurality of parallel branches each including a source of potential, a winding of a polarized electromagnet and a resistance interposed between said source of potential and one terminal of said winding, and a common termination for the other terminals of the electromagnet windings of all said branches whereby shunting of the resistance in any of said branches results in the flow of current in one direction in the branch including the shunted resistance and in the reverse direction in the other of said branches.

4. In a register circuit, a plurality of polarized relay windings, a source of potential, means including a resistance interposed between one terminal of each of said windings and said source of potential, electrical connecting means interconnecting the other terminals of all of said relay windings to effect a plurality of parallel branch circuits, each including one of said relay windings and its associated resistance, and means for separately connecting certain of the effected parallel branch circuits in series relation to the remaining thereof so that the relay windings of the said certain of the effected parallel branch circuits are poled oppositely to the remaining of said relay windings with respect to said source of potential, said means including switching means for shunting the resistances of the said certain of the effected parallel branch circuits.

5. In a register circuit, a plurality of parallel branch circuits each including the winding of a polarized electromagnet, a source of potential and a resistance interposed between one terminal of the relay winding and the source of potential, whereby all relay windings of said branch circuits are similarly poled with respect to said source of potential, common terminal means for the other terminals of said relay windings, and means for reversing the polarity of the windings of certain of said branch circuits with respect to said source of potential comprising means for shunting the resistances associated with the relay windings of certain other of said branch circuits.

6. In combination, a register circuit for recording pulses on a two-out-of-five code basis comprising a plurality of single-coil polarized relays each operable in a "write" direction and in an "erase" direction and maintained operated in either direction independently of current flow through the coil thereof, a plurality of resistors, a source of potential, means serially connecting a terminal of each of said relays to said source of potential by way of a different one of said resistances and the other terminals of said relays to each other to effect a plurality of normally non-conducting parallel branch circuits each including a relay coil and all relay coils poled similarly with respect to said source of potential, and means for shunting the resistances of the effected branch circuits in combinations of two resistances whereby the two branch circuits in which the resistances are shunted carry current in the said "write" direction to energize the relay coils included therein accordingly, and the remaining branch circuits carry current in the said "erase" direction to energize the relay coils included therein accordingly.

7. In a register circuit, a first polarized relay winding having first and second terminals, a second polarized relay winding having similar first and second terminals, a source of potential, means including a first resistance connecting the first terminal of said first relay to said source of potential, means including a second resistance connecting the first terminal of said second relay to said source of potential, means connecting the second terminal of said first relay winding with the second terminal of said second relay winding whereby a pair of parallel branch circuits is effected, each originating at said source of potential and terminating in the connecting means interconnecting the second terminals of said first and second relay winding, and means for causing current to flow from said source through each of said relay windings in a different direction comprising means for shunting one of said resistances.

8. A register circuit comprising a plurality of polarized relays, a corresponding number of resistances and a source of potential, each of said relays operating to perform a "write" function or an "erase" function depending upon the direction of current flow through its winding, means connecting each of said relays with said source of potential by way of a different one of said resistances to thereby effect a plurality of parallel branch circuits each including one of said relays and one of said resistances, and common terminal means for said branch circuits whereby the shunting of the resistances in any number of said branch circuits causes the corresponding relays to perform "write" functions and the remaining relays to perform "erase" functions.

References Cited in the file of this patent

UNITED STATES PATENTS

| | | |
|---|---|---|
| 1,383,750 | Parker | July 5, 1921 |
| 2,696,600 | Serrell | Dec. 7, 1954 |
| 2,744,245 | Low | May 1, 1956 |